(12) United States Patent
Wu et al.

(10) Patent No.: US 7,556,430 B2
(45) Date of Patent: Jul. 7, 2009

(54) LINEAR MOTION GUIDE APPARATUS HAVING LUBRICATING DEVICE

(75) Inventors: Chun Liang Wu, Taichung (TW); Hsin Tsun Hsu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 349 days.

(21) Appl. No.: 11/647,106

(22) Filed: Dec. 27, 2006

(65) Prior Publication Data
US 2008/0159668 A1    Jul. 3, 2008

(51) Int. Cl.
*F16C 29/04*    (2006.01)
(52) U.S. Cl. ............................. 384/13; 184/5; 384/45
(58) Field of Classification Search .................. 384/13, 384/45; 184/5
See application file for complete search history.

(56) References Cited
U.S. PATENT DOCUMENTS 6,123,457 A * 9/2000 Suzuki et al. ................. 384/13
6,290,394 B1 9/2001 Obara et al. .................. 384/13
6,401,867 B1 * 6/2002 Michioka et al. ............... 184/5
6,988,517 B1 * 1/2006 Hsu et al. ..................... 141/67
2003/0164264 A1 * 9/2003 Luo ............................. 184/5
2005/0201644 A1 * 9/2005 Lee et al. ...................... 384/13
2006/0215943 A1 * 9/2006 Agari et al. ................... 384/13

* cited by examiner

*Primary Examiner*—Thomas R Hannon
(74) *Attorney, Agent, or Firm*—Charles E. Baxley

(57) ABSTRACT

A linear motion guide device includes a slider slidably attached onto the guide rail, a ball bearing device disposed between the slider and the guide rail, and a lubricating device having a housing slidably attached onto the guide rail for receiving and for supplying a lubricant to lubricate the ball bearing device. A lubricant-conveying member is disposed in the housing and has an upper segment and one or more lower segments and one or more middle segments coupled between the upper segment and the lower segments for absorbing the lubricant even when the lubricant is below a lower level and even when the housing is tilted or turned up side down relative to the slider and the guide rail.

17 Claims, 7 Drawing Sheets

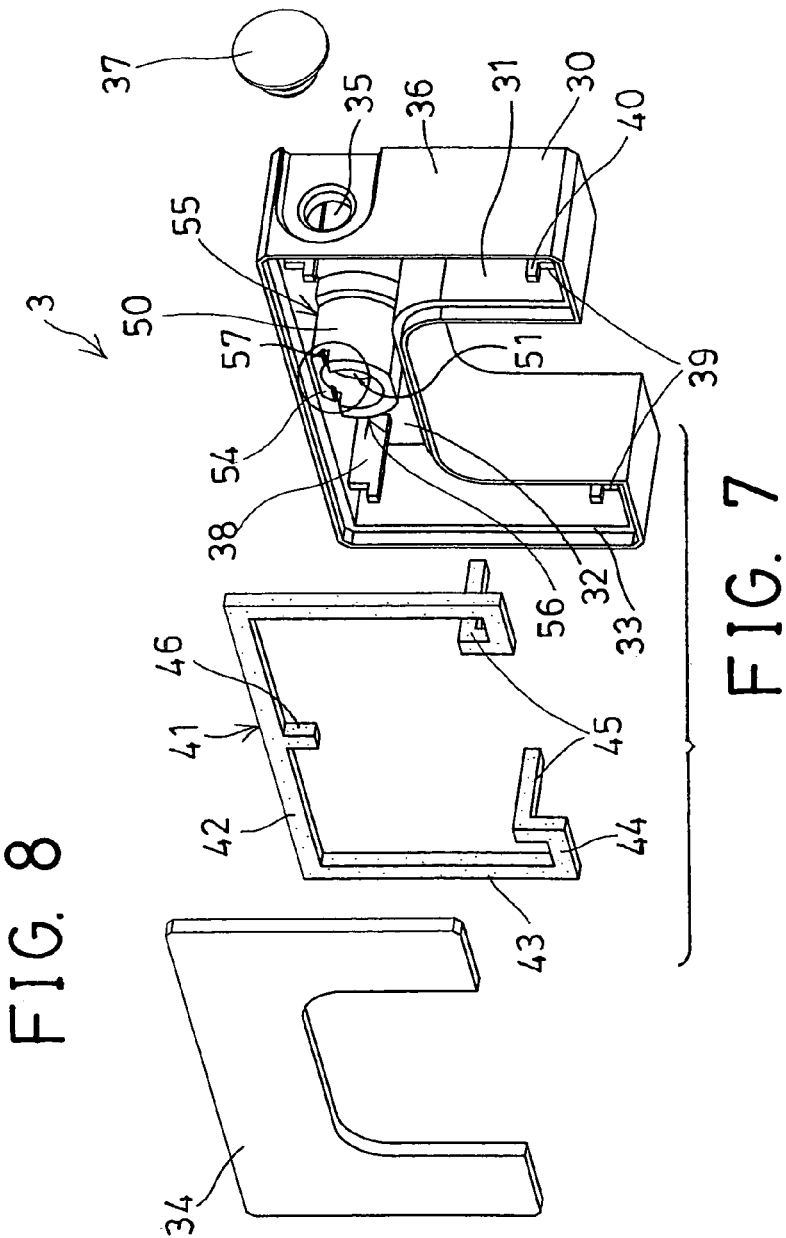

LINEAR MOTION GUIDE APPARATUS HAVING LUBRICATING DEVICE

BACKGROUND OF THE INVENTION

1. Field of the Invention

The present invention relates to a linear motion guide apparatus, and more particularly to a linear motion guide apparatus including a lubricating device designed and arranged to be attached to the linear motion guide apparatus for effectively lubricating the linear motion guide apparatus even when the lubricating oil or fluid has been decreased below a predetermined lower level and even when the lubricating device is tilted or turned up side down relative to the slide block or slider and the guide rail.

2. Description of the Prior Art

Typical linear motion guide devices comprise a slider or slide block slidably attached onto a guide rail, and normally, a ball bearing device disposed between the slider and the guide rail for facilitating the sliding movement between the slider and the guide rail and for allowing the slider and the guide rail to be smoothly moved relative to each other.

For example, U.S. Pat. No. 6,290,394 to Obara et al. discloses one of the typical linear motion rolling guide units comprising a slider or slide block slidably attached onto a guide rail. In the typical linear motion rolling guide units, a specially designed casing is designed and attached to the slider or slide block and provided for receiving a lubricating oil or fluid or lubricant and a lubricant-containing member therein and for supplying the lubricating oil or fluid or lubricant to lubricate the typical linear motion rolling guide units.

However, when the typical linear motion rolling guide unit is tilted relative to the slide block or slider and the guide rail, or when the typical linear motion rolling guide unit is disposed or arranged up side down, the lubricating oil or fluid or lubricant may not be suitably supplied upwardly to lubricate the typical linear motion rolling guide units such that the typical linear motion rolling guide unit may not be suitably lubricated with the lubricating oil or fluid or lubricant and such that the typical linear motion rolling guide unit may have a good chance to be damaged due to the friction and the high temperature.

In addition, when disposed or arranged in the normal erected working position and when the lubricating oil or fluid or lubricant has been consumed or lower than a predetermined lower level, the lubricating oil or fluid or lubricant also may no longer be suitably supplied upwardly to lubricate the typical linear motion rolling guide units.

The present invention has arisen to mitigate and/or obviate the afore-described disadvantages of the conventional linear motion guide devices.

SUMMARY OF THE INVENTION

The primary objective of the present invention is to provide a linear motion guide apparatus including a lubricating device designed and arranged to be attached to the linear motion guide apparatus for effectively lubricating the linear motion guide apparatus even when the lubricating oil or fluid has been decreased below a predetermined lower level and even when the lubricating device is tilted or turned up side down relative to the slide block or slider and the guide rail.

In accordance with one aspect of the invention, there is provided a linear motion guide apparatus comprising a guide rail, a slider slidably attached onto the guide rail for moving along the guide rail, a ball bearing device disposed between the slider and the guide rail for facilitating a sliding movement between the slider and the guide rail and for allowing the slider and the guide rail to be smoothly moved relative to each other, and a lubricating device including a housing slidably attached onto the guide rail and having a chamber formed therein for receiving a lubricant therein and for supplying the lubricant to lubricate the ball bearing device, and a lubricant-conveying member disposed in the chamber of the housing and having an upper segment and at least one lower segment and at least one middle segment coupled between the upper segment and the lower segment for absorbing the lubricant into the lubricant-conveying member even when the lubricating oil or fluid has been decreased below a predetermined lower level and even when the housing of the lubricating device is tilted or turned up side down relative to the slider and the guide rail.

The housing includes at least one post extended into the chamber of the housing for engaging with the lubricant-conveying member and for anchoring the lubricant-conveying member within the chamber of the housing. The post of the housing includes a recess formed therein and defined by an anchoring leg for engaging with the lubricant-conveying member and for anchoring and positioning the lubricant-conveying member within the chamber of the housing.

The lubricant-conveying member includes at least one finger extended from the lower segment of the lubricant-conveying member for absorbing the lubricant into the lubricant-conveying member even when the lubricant is below a lower level. The finger is perpendicular to the lower segment of the lubricant-conveying member.

The housing includes a port formed therein and communicating with the chamber of the housing for filling the lubricant into the chamber of the housing, and a cap engaged with the port of the housing for enclosing the port of the housing.

The slider includes an end cap having a lubricant-containing member disposed therein, and a lubricant-transmitting element engaged with and between the lubricant-containing member and the lubricant-conveying member for allowing the lubricant to be transmitted from the lubricant-conveying member to the lubricant-containing member.

The housing includes a tube extended into the chamber of the housing and having a bore formed therein, and a shank is engaged into the bore of the tube and having a conduit formed therein for receiving the lubricant-transmitting element.

The shank includes a passage laterally formed through the shank and communicating with the conduit of the shank, the lubricant-transmitting element includes an end portion extended out of the shank for engaging with the lubricant-conveying member and an arm laterally extended from the shank and having at least one end portion extended out of the shank for engaging with the lubricant-containing member.

The tube includes an anchoring member extended into the bore of the tube, the shank includes a peripheral groove formed therein for engaging with the anchoring member of the tube and for detachably securing the tube of the housing to the shank. The end cap includes a screw hole formed therein, the shank includes a threaded portion for engaging with the screw hole of the end cap and for securing the shank to the end cap.

The slider includes a wiper attached to the end cap, and the shank includes an engaging member for engaging with the wiper and for securing the end cap and the wiper together. The tube includes a notch formed therein and communicating with the chamber of the housing for receiving the upper segment of the lubricant-conveying member and for anchoring the lubricant-conveying member in the chamber of the housing.

The tube includes at least one slot formed therein and communicating with the notch of the tube, the slot of the tube is arranged for allowing an air to flow through the slot of the tube and for preventing the lubricant from flowing through the slot of the tube and from flowing between the bore of the tube and the chamber of the housing. The lubricant-conveying member includes an extension extended into the bore of the tube for engaging with the lubricant-transmitting element.

The guide rail includes at least one longitudinal depression formed therein for engaging with the ball bearing device, and the lubricant-containing member includes at least one protrusion extended therefrom and engaged into the longitudinal depression of the guide rail for supplying the lubricant to the longitudinal depression of the guide rail.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 7 is a partial exploded view of the lubricating device for the linear motion guide apparatus;

FIG. 8 is an enlarged partial perspective view illustrating the housing of the lubricating device for the linear motion guide apparatus.

DETAILED DESCRIPTION OF THE PREFERRED EMBODIMENT

Figure 1:
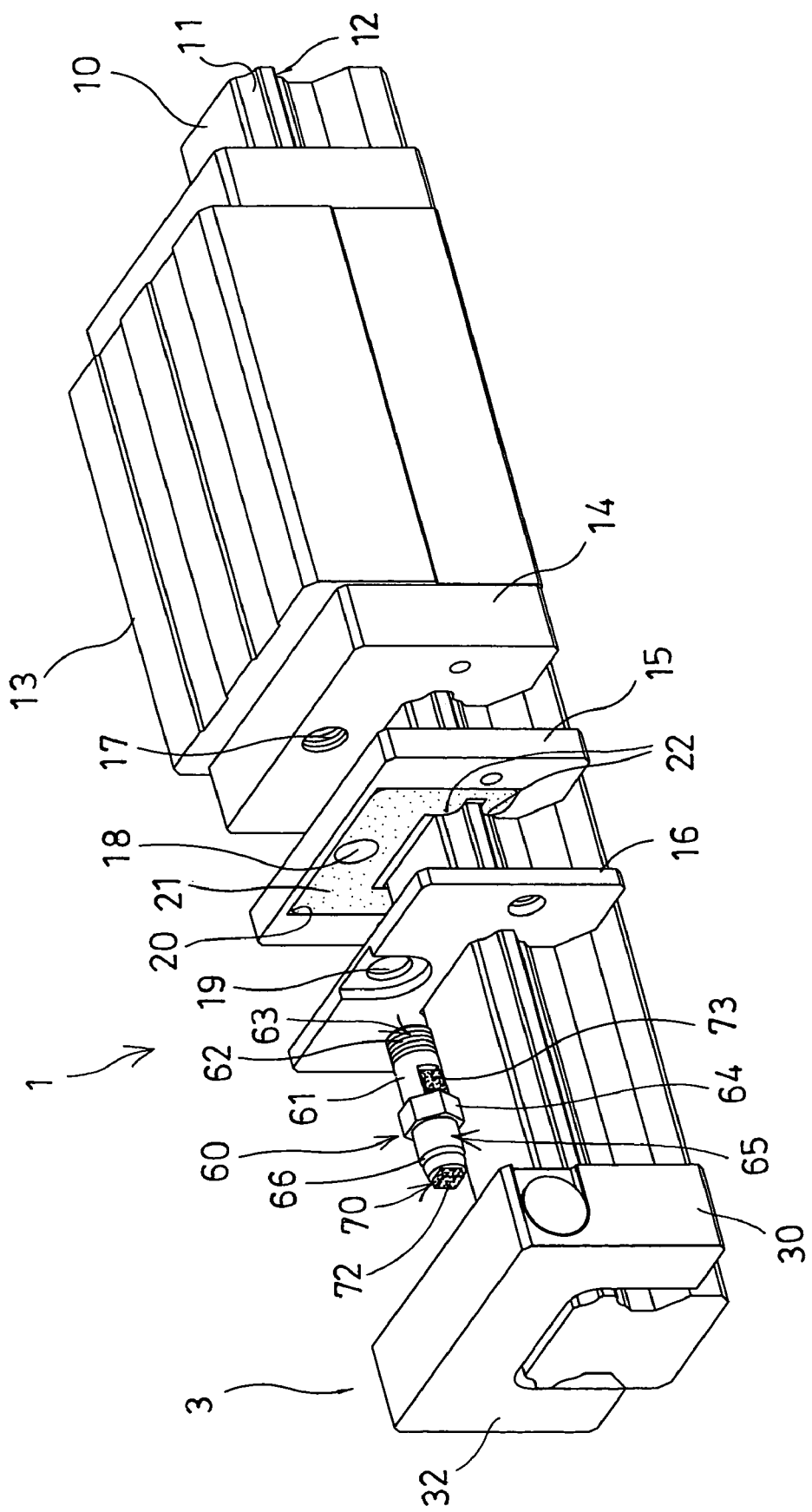
FIG. 1 is a partial exploded view of a linear motion guide apparatus in accordance with the present invention.
Figure 2:
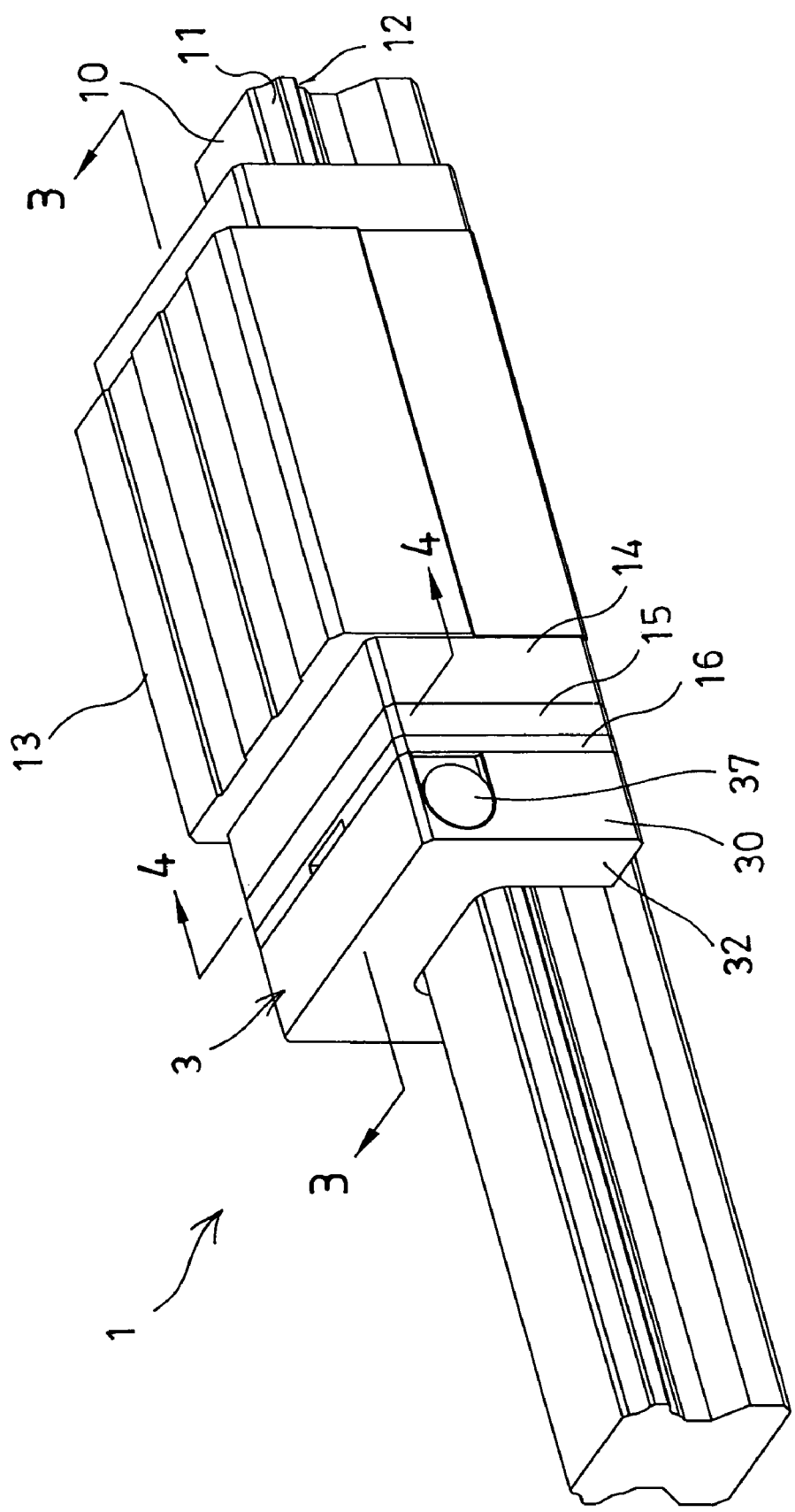
FIG. 2 is a perspective view of the linear motion guide apparatus.

Referring to the drawings, and initially to FIGS. 1-4, a linear motion guide apparatus 1 in accordance with the present invention comprises a guide rail 10 including one or more longitudinal depressions 11 formed in either of the side portion 12 thereof, and a slide block or a slider 13 slidably attached onto the guide rail 10 and arranged to be moved along the guide rail 10, and normally, a ball bearing device 80 (FIG. 4) to be disposed between the slider 13 and the guide rail 10 and engaged with the longitudinal depressions 11 of the guide rail 10 for facilitating the sliding engagement and movement between the slider 13 and the guide rail 10 and for allowing the slider 13 and the guide rail 10 to be smoothly moved relative to each other.

The linear motion guide apparatus 1 further includes two spacers 14 disposed on the two sides or end portions or outer portions of the slider 13, one or two end caps 15 disposed on the outer portions of either or both of the spacers 14 respectively, and two dust caps or wipers 16 disposed on the outer portions of either or both of the end caps 15 and attached or engaged with the end caps 15 respectively. The spacers 14 and the end caps 15 and the dust caps or wipers 16 may be secured together with such as latches or fasteners (not shown). The arrangement and the coupling of the ball bearing device 80 and the spacers 14 and the end caps 15 and the dust caps or wipers 16 are not related to the present invention and will not be described in further details.

Figure 9:
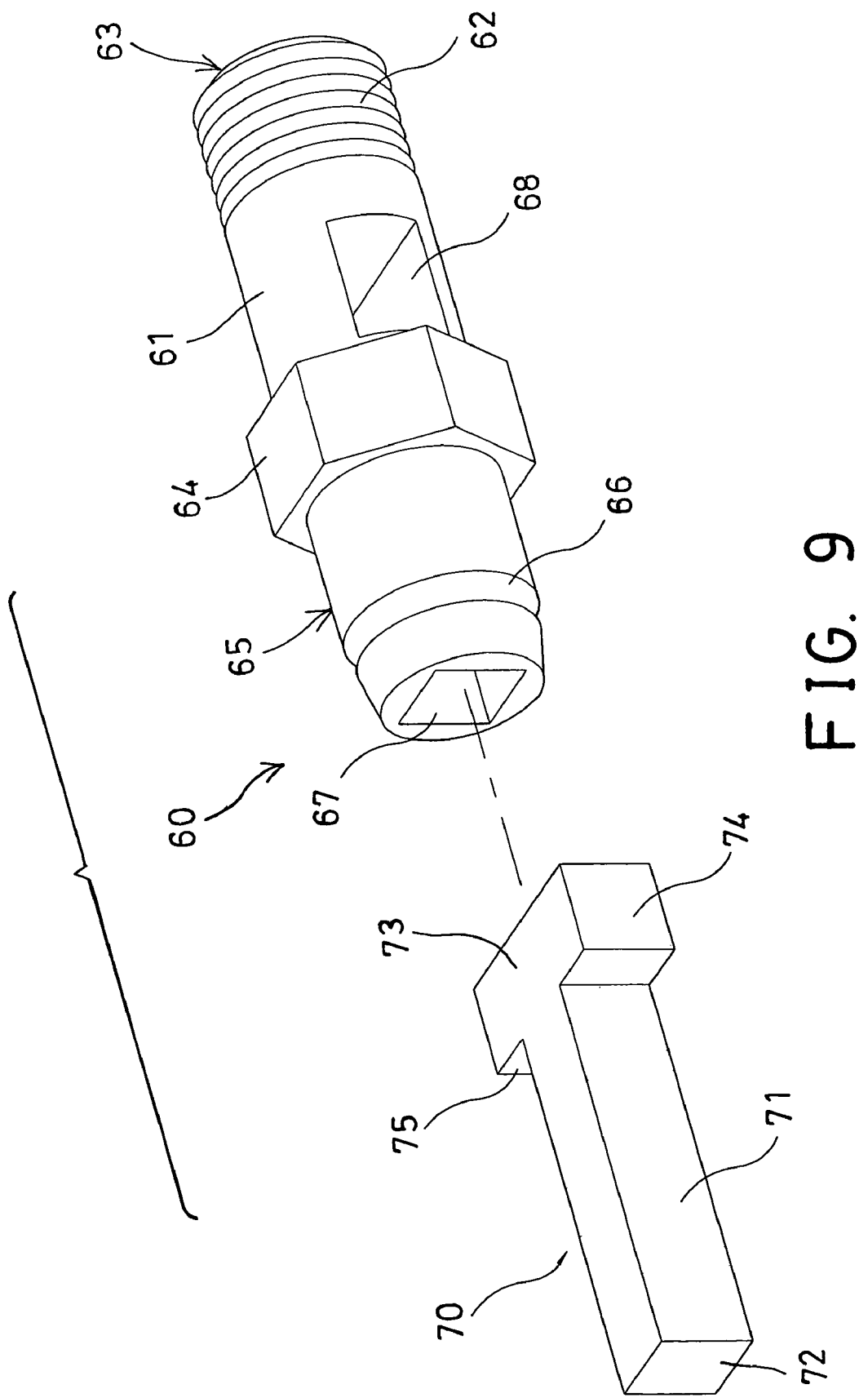
FIG. 9 is a partial exploded view illustrating some of the parts or elements of the lubricating device for the linear motion guide apparatus.

One of the spacers 14 includes a screw hole 17 formed therein (FIG. 1), and the corresponding end cap 15 and the wiper 16 each include an orifice 18, 19 formed therein (FIG. 1) and aligned with the screw hole 17 of the end cap 15 for receiving a coupling device or lubricant-transmitting device 60 (FIGS. 1, 3, 9) which may be threaded or engaged with the screw hole 17 of the spacer 14 and which may be engaged with the wiper 16 for solidly securing the spacer 14 and the end cap 15 and the wiper 16 together. The configuration and the function of the lubricant-transmitting device 60 will further be described in further details hereinafter. The end cap 15 includes a compartment 20 formed therein and facing toward the wiper 16 for receiving a lubricant-containing member 21 therein.

The lubricant-containing member 21 is preferably made of spongy materials, sintered resinous components, or sintered porous bodies of high molecular polymers having a porous structure including continuous voids therein for receiving or absorbing the lubricant therein and for supplying the lubricant to effectively lubricate the ball bearing device 80 of the linear motion guide apparatus 1. It is preferable that the lubricant-containing member 21 includes one or more protrusions 22 extended therefrom and engaged into the longitudinal depressions 11 of the guide rail 10 (FIGS. 1, 4) for suitably supplying the lubricant to the longitudinal depressions 11 of the guide rail 10 in order to lubricate the ball bearing device and thus for facilitating the sliding movement between the slider 13 and the guide rail 10.

A lubricating device 3 is further provided and arranged to be slidably attached onto the guide rail 10 and attached or coupled or secured to the slider 13 or to the end cap 15 and/or the wiper 16 for suitably supplying the lubricant to the lubricant-containing member 21. As shown in FIGS. 1-6, and particularly in FIGS. 3, 6, 7, the lubricating device 3 includes a housing 30 having a chamber 31 formed therein and defined by an end wall or front wall 32 (FIG. 5) for receiving a lubricating oil or fluid or lubricant therein. The housing 30 includes an inner peripheral shoulder 33 formed in one end or rear end thereof and spaced away from the front wall 32 of the housing 30 (FIG. 5) for seating or anchoring or engaging with a cover 34 which may be secured to the housing 30 with such as latches or fasteners (not shown) and which may enclose the chamber 31 of the housing 30 for sealingly receiving or confining the lubricant in the chamber 31 of the housing 30.

The housing 30 includes a port 35 formed in one of the side walls 36 of the housing 30 and communicating with the chamber 31 of the housing 30 for filling the lubricant into the chamber 31 of the housing 30, and a cap 37 may be engaged with the port 35 of the housing 30 for enclosing the port 35 of the housing 30 and for preventing the lubricant from flowing out of the chamber 31 of the housing 30. The housing 30 further includes one or more (such as four) posts 38 extended into the chamber 31 from the front wall 32 of the housing 30 and each having a recess 39 formed therein and defined by an anchoring leg 40 for engaging with a lubricant-conveying member 41 and for anchoring or positioning or retaining the lubricant-conveying member 41 within the chamber 31 of the housing 30.

The lubricant-conveying member 41 is also made of spongy materials, sintered resinous components, or sintered porous bodies of high molecular polymers having a porous structure including continuous voids therein for receiving or absorbing the lubricant therein, and includes an upper segment 42, one or more (such as two) lower segments 44, and one or more (such as two) side or middle segments 43 coupled between the upper segment 42 and the lower segments 44, in which the upper segment 42 and the two lower segments 44 may be engaged with the recesses 39 and the anchoring legs 40 of the posts 38 of the housing 30 for allowing the lubricant-conveying member 41 to be stably anchored or positioned or retained within the chamber 31 of the housing 30 and for allowing the lubricant-conveying member 41 to be suitably extended or located in the upper and the lower and the middle or side portions of the chamber 31 of the housing 30.

The lubricant-conveying member 41 further includes a finger 45 extended from each of the lower segments 44 and preferably perpendicular to the lower segments 44 and extended into the chamber 31 of the housing 30 for absorbing the lubricant and for allowing the lubricant to be suitably absorbed and contained within the upper segment 42 and the side segments 43 and the lower segments 44 even when the lubricant has been decreased below a predetermined lower level. It is preferable that the lubricant-conveying member 41 further includes an extension 46 extended downwardly from the upper segment 42 or extended downwardly into the chamber 31 of the housing 30 for lubricant absorbing and containing and conveying and transmitting purposes which will be described in further details hereinafter.

Figure 5:
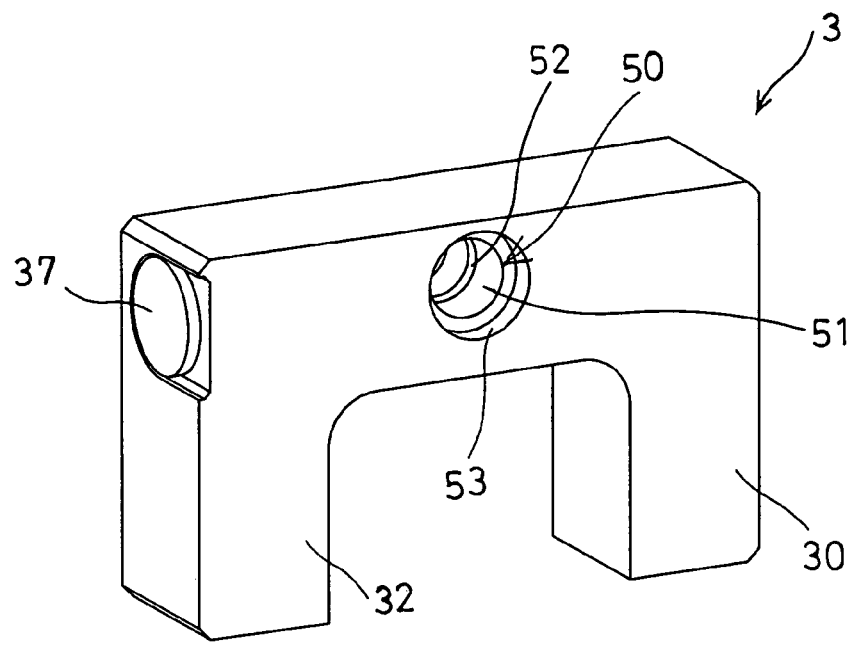
FIG. 5 is a perspective view illustrating a housing of the lubricating device for the linear motion guide apparatus as seen from an outer portion of the housing.

The housing 30 further includes a tube 50 extended into the chamber 31 from the front wall 32 of the housing 30 and having a bore 51 formed therein and formed or opened through the front wall 32 (FIG. 5) for receiving the lubricant-transmitting device 60. It is preferable that the tube 50 is extended toward the cover 34 and engaged with the cover 34 (FIG. 3) for separating the bore 51 of the tube 50 and the chamber 31 of the housing 30 from each other. The tube 50 includes an anchoring member 52, such as a peripheral anchoring member 52 extended into the bore 51 of the tube 50. The tube 50 further includes an inner peripheral shoulder 53 formed in one end or front end thereof or formed in the front wall 32 of the housing 30 (FIG. 5).

Figure 6:
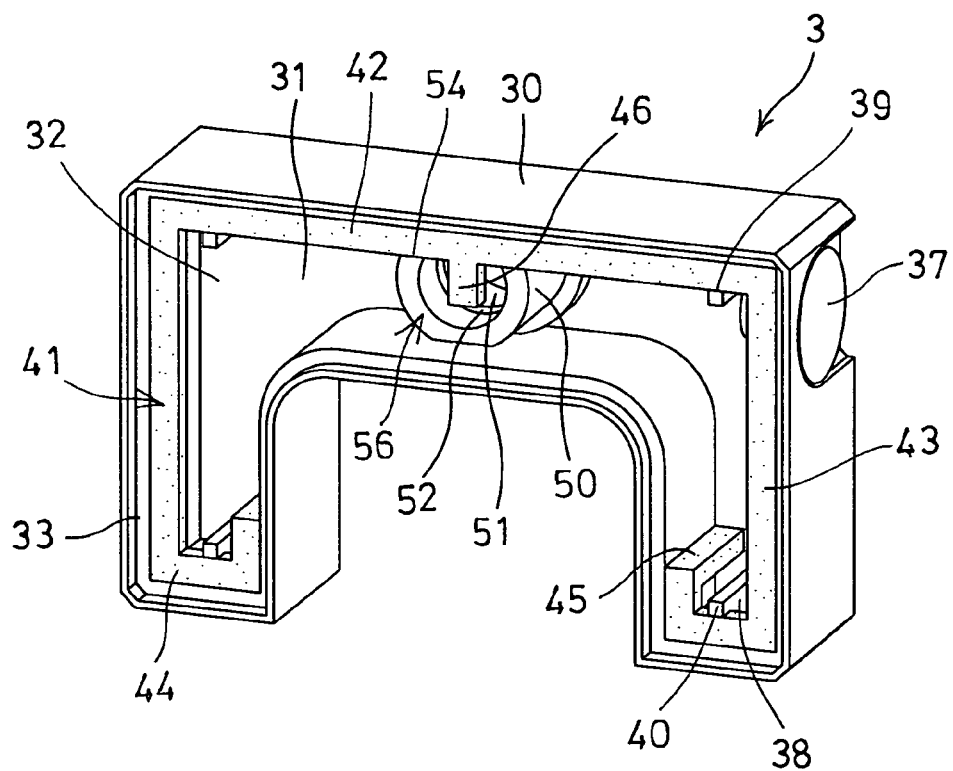
FIG. 6 is another perspective view of the housing of the lubricating device for the linear motion guide apparatus as seen from an inner portion of the housing.

As shown in FIGS. 6-8, the tube 50 further includes a cut-off portion or notch 54 formed in the upper portion 55 and/or in the inner or rear portion 56 of the tube 50 and communicating with the chamber 31 of the housing 30 for receiving or seating or anchoring the upper segment 42 of the lubricant-conveying member 41 and arranged for allowing the extension 46 of the lubricant-conveying member 41 to be extended into the bore 51 of the tube 50 (FIG. 6) and thus for allowing the lubricant to be suitably sent or transmitted into the bore 51 of the tube 50 with the lubricant-conveying member 41. The tube 50 further includes one or more (such as two) slots 57 formed in the upper portion 55 and/or in the inner or rear portion 56 of the tube 50 and communicating with the cut-off portion or notch 54 of the tube 50 (FIG. 8). The upper segment 42 of the lubricant-conveying member 41 is engaged in the notch 54 of the tube 50 for partially blocking the slots 57 of the tube 50.

The slots 57 of the tube 50 include a predetermined and reduced size or width or depth or height or cross section provided and arranged for allowing only the air to flow through the slots 57 of the tube 50 or to flow between the bore 51 of the tube 50 and the chamber 31 of the housing 30, and due to the surface tension of the lubricant, for preventing the lubricant from flowing through the slots 57 of the tube 50 or from flowing between the bore 51 of the tube 50 and the chamber 31 of the housing 30, or for preventing the lubricant from flowing out of the chamber 31 of the housing 30. The air may flow through the slots 57 of the tube 50 and may flow into the chamber 31 of the housing 30 when the lubricant is consumed or used or lowered for preventing the negative pressure from being built or generated within the chamber 31 of the housing 30 and thus for allowing the lubricant to be suitably flown or conveyed and transmitted into the bore 51 of the tube 50 with the lubricant-conveying member 41.

As shown in FIGS. 1, 3-4 and 9, the lubricant-transmitting device 60 includes a shank 61 receivable or engageable in the bore 51 of the tube 50 and engageable into or through the orifice 18, 19 of the end cap 15 and the wiper 16, and includes an outer thread or threaded portion 62 formed in one end or front end 63 thereof for threading or engaging with the screw hole 17 of the end cap 15 and for securing the lubricant-transmitting device 60 to the end cap 15 and/or the wiper 16 and/or the spacer 14 and/or the slider 13. The shank 61 includes an engaging member 64, such as a hexagonal engaging member 64 formed or provided in the middle portion thereof for engaging with the end cap 15 and/or the wiper 16 and for solidly securing the end cap 15 and the wiper 16 and the spacer 14 together.

Figure 3:
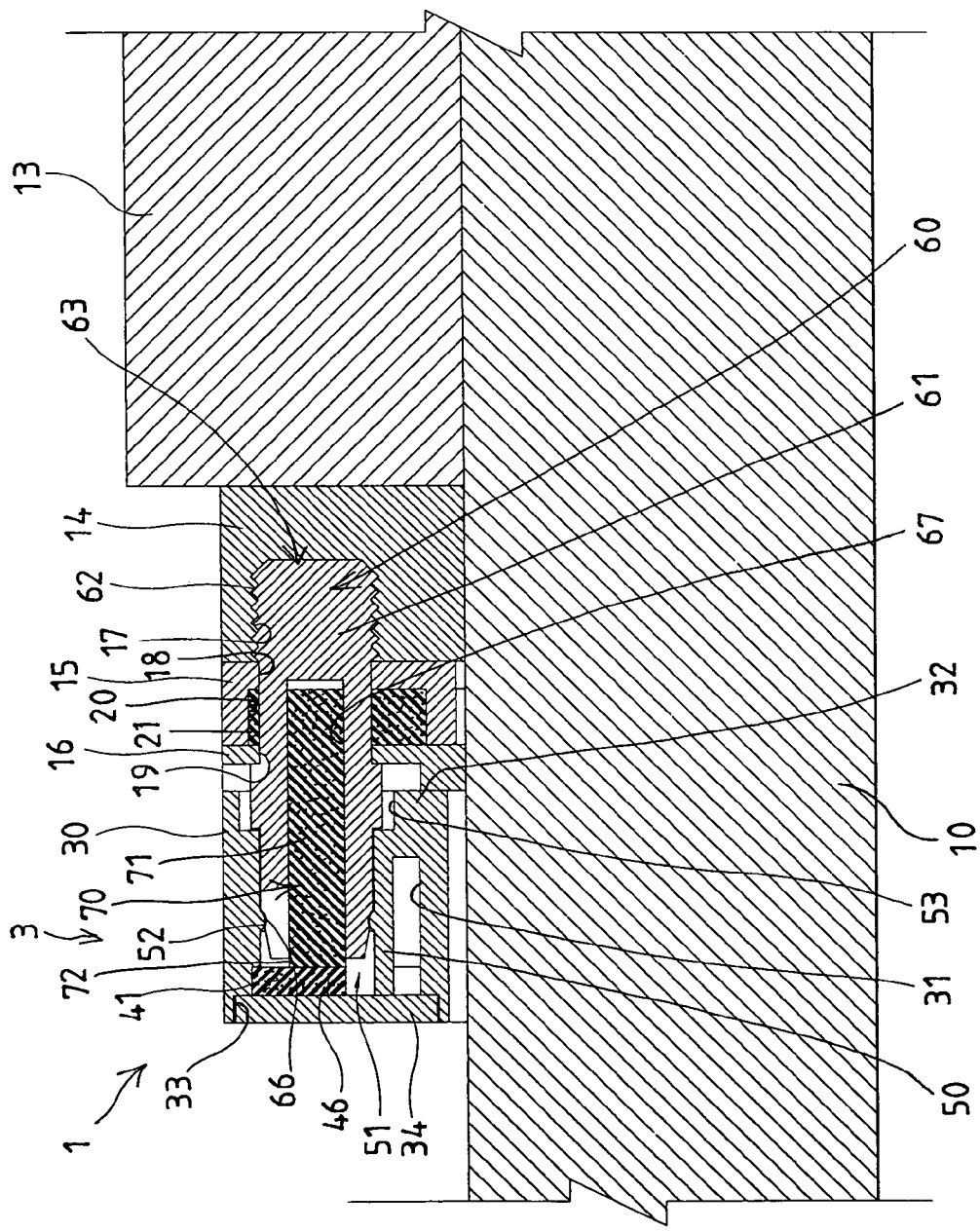
FIG. 3 is a partial cross sectional view of the linear motion guide apparatus taken along lines 3-3 of FIG. 2.
Figure 4:
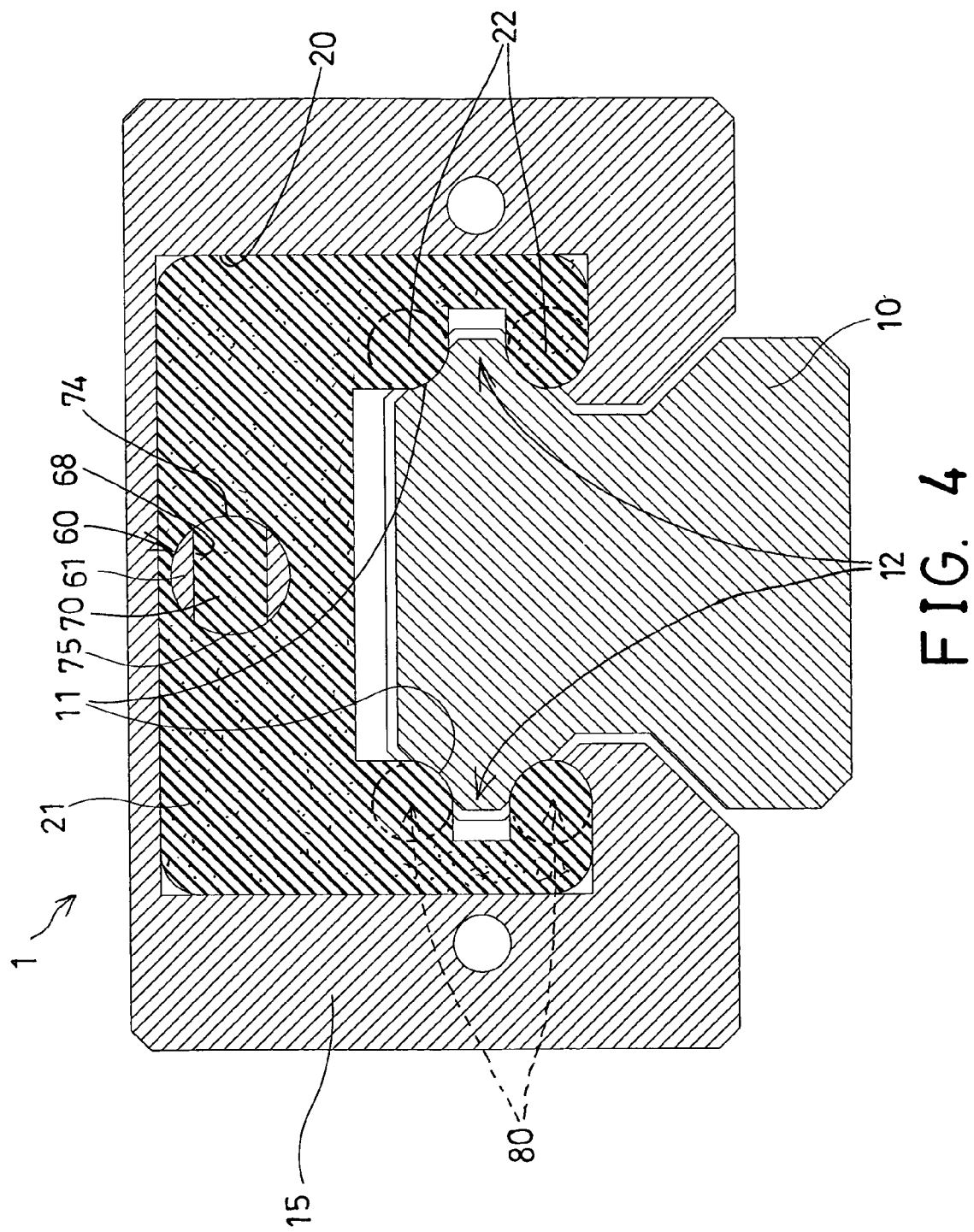
FIG. 4 is another cross sectional view of the linear motion guide apparatus taken along lines 4-4 of FIG. 2.

The shank 61 includes another end or rear end portion 65 engageable in the bore 51 of the tube 50, and a peripheral groove 66 formed in the rear end portion 65 thereof for engaging with the anchoring member 52 of the tube 50 (FIG. 3) and for detachably anchoring or securing or latching the shank 61 of the lubricant-transmitting device 60 to the end cap 15 and/or the wiper 16 and/or the spacer 14 and/or the slider 13. The engaging member 64 of the shank 61 may be received in the inner peripheral shoulder 53 of the tube 50 (FIG. 3). The shank 61 includes a conduit 67 formed therein and formed or opened through the rear end portion 65, but not formed or opened through the front end 63 of the shank 61, and a passage 68 laterally formed through the middle portion of the shank 61 and communicating with the conduit 67 of the shank 61.

A lubricant-transmitting element 70 includes a longitudinal member or stem 71 engaged into the conduit 67 of the shank 61 and includes one end or rear end portion 72 partially extended out of the shank 61 for engaging with the lubricant-conveying member 41 and for allowing the lubricant to be transmitted from such as the extension 46 or the upper segment 42 of the lubricant-conveying member 41 to the stem 71 of the lubricant-transmitting element 70. The lubricant-transmitting element 70 is also made of spongy materials, sintered resinous components, or sintered porous bodies of high molecular polymers having a porous structure including continuous voids therein for receiving or absorbing the lubricant therein.

The lubricant-transmitting element 70 further includes an arm 73 laterally formed or extended from the other end portion thereof and having two end portions 74, 75 partially extended out of the shank 61 for engaging with the lubricant-containing member 21 (FIG. 4) and for allowing the lubricant to be transmitted from the lubricant-transmitting element 70 to the lubricant-containing member 21, and then to supply the lubricant to lubricate the ball bearing device 80 of the linear motion guide apparatus 1, such that the lubricant may be absorbed into the lubricant-conveying member 41 via or by the lower segments 44 or the fingers 45 of the lubricant-conveying member 41, and may then be transmitted from the extension 46 or the upper segment 42 of the lubricant-conveying member 41 to the stem 71 of the lubricant-transmitting element 70, and may then be transmitted from the arm 73 of the lubricant-transmitting element 70 to the lubricant-containing member 21 for supplying the lubricant to lubricate the ball bearing device 80 of the linear motion guide apparatus 1.

In assembling, as shown in FIG. 1, the shank 61 of the lubricant-transmitting device 60 may be engaged into or through the orifice 18, 19 of the end cap 15 and the wiper 16, and may have the threaded portion 62 threaded or engaged with the screw hole 17 of the end cap 15 for securing the lubricant-transmitting device 60 to the end cap 15 and/or the wiper 16 and/or the spacer 14 and/or the slider 13, and may have the engaging member 64 engaged with the end cap 15 and/or the wiper 16 for solidly securing the end cap 15 and the wiper 16 and the spacer 14 together. The housing 30 of the lubricating device 3 may then be slidably attached or engaged onto the guide rail 10 and may have the rear end portion 65 of the shank 61 engaged into the bore 51 of the tube 50 until the anchoring member 52 of the tube 50 is engaged into the peripheral groove 66 at the rear end portion 65 of the shank 61 for detachably anchoring the housing 30 to the end cap 15 and/or the wiper 16 and/or the spacer 14 and/or the slider 13 with the shank 61 of the lubricant-transmitting device 60.

In operation, the lower segments 44 or the fingers 45 of the lubricant-conveying member 41 that are engaged in the lower portion of the chamber 31 of the housing 30 may suitably absorb the lubricant and contain the lubricant in the upper segment 42 and the side segments 43 and the lower segments 44 even when the lubricant has been decreased below a predetermined lower level. The lubricant may then be transmitted from the extension 46 or the upper segment 42 of the lubricant-conveying member 41 to the stem 71 of the lubricant-transmitting element 70, and may then be transmitted from the arm 73 of the lubricant-transmitting element 70 to the lubricant-containing member 21 for supplying the lubricant to lubricate the ball bearing device 80 of the linear motion guide apparatus 1.

It is to be noted that the side segments 43 and the upper segment 42 and/or the lower segments 44 may also be used to absorb the lubricant into the lubricant-conveying member 41 in order to suitably contain and convey or supply the lubricant to lubricate the ball bearing device 80 of the linear motion guide apparatus 1 even when the housing 30 of the lubricating device 3 is tilted or turned up side down relative to the slide block or slider 13 and the guide rail 10.

Accordingly, the linear motion guide apparatus in accordance with the present invention includes a lubricating device designed and arranged to be attached to the linear motion guide apparatus for effectively lubricating the linear motion guide apparatus even when the lubricating oil or fluid has been decreased below a predetermined lower level and even when the lubricating device is tilted or turned up side down relative to the slide block or slider and the guide rail.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A linear motion guide apparatus comprising:
   a guide rail,
   a slider slidably attached onto said guide rail for moving along said guide rail,
   a ball bearing device disposed between said slider and said guide rail for facilitating a sliding movement between said slider and said guide rail and for allowing said slider and said guide rail to be smoothly moved relative to each other, and
   a lubricating device including a housing slidably attached onto said guide rail and having a chamber formed therein for receiving a lubricant therein and for supplying the lubricant to lubricate said ball bearing device, and a lubricant-conveying member disposed in said chamber of said housing for absorbing the lubricant into said lubricant-conveying member even when said housing of said lubricating device is tilted or turned up side down relative to said slider and said guide rail, said housing including a tube extended into said chamber of said housing and having a bore formed therein, and a shank engaged into said bore of said tube and having a conduit formed therein, and
   said slider including an end cap having a lubricant-containing member disposed therein, and a lubricant-transmitting element engaged with said lubricant-containing member and said lubricant-conveying member for transmitting the lubricant from said lubricant-conveying member to said lubricant-containing member, said lubricant-transmitting element being received in said conduit of said shank.

2. The linear motion guide apparatus as claimed in claim 1, wherein said housing includes at least one post extended into said chamber of said housing for engaging with said lubricant-conveying member and for anchoring said lubricant-conveying member within said chamber of said housing.

3. The linear motion guide apparatus as claimed in claim 2, wherein said at least one post of said housing includes a recess formed therein and defined by an anchoring leg for engaging with said lubricant-conveying member and for anchoring said lubricant-conveying member within said chamber of said housing.

4. The linear motion guide apparatus as claimed in claim 1, wherein said lubricant-conveying member includes an upper segment and at least one lower segment and at least one middle segment coupled between said upper segment and said lower segment, and at least one finger extended from said at least one lower segment of said lubricant-conveying member for absorbing the lubricant into said lubricant-conveying member even when the lubricant is below a lower level.

5. The linear motion guide apparatus as claimed in claim 4, wherein said at least one finger is perpendicular to said at least one lower segment of said lubricant-conveying member.

6. The linear motion guide apparatus as claimed in claim 1, wherein said housing includes a port formed therein and communicating with said chamber of said housing for filling the lubricant into said chamber of said housing, and a cap engaged with said port of said housing for enclosing said port of said housing.

7. The linear motion guide apparatus as claimed in claim 1, wherein said shank includes a passage laterally formed through said shank and communicating with said conduit of said shank, said lubricant-transmitting element includes an end portion extended out of said shank for engaging with said lubricant-conveying member and an arm laterally extended from said shank and having at least one end portion extended out of said shank for engaging with said lubricant-containing member.

8. The linear motion guide apparatus as claimed in claim 1, wherein said tube includes an anchoring member extended into said bore of said tube, said shank includes a peripheral groove formed therein for engaging with said anchoring member of said tube and for detachably securing said tube of said housing to said shank.

9. The linear motion guide apparatus as claimed in claim 8, wherein said end cap includes a screw hole formed therein, said shank includes a threaded portion for engaging with said screw hole of said end cap and for securing said shank to said end cap.

10. The linear motion guide apparatus as claimed in claim 1, wherein said slider includes a wiper attached to said end cap, and said shank includes an engaging member for engaging with said wiper and for securing said end cap and said wiper together.

11. The linear motion guide apparatus as claimed in claim 1, wherein said lubricant-conveying member includes an upper segment, said tube includes a notch formed therein and communicating with said chamber of said housing for receiving said upper segment of said lubricant-conveying member and for anchoring said lubricant-conveying member in said chamber of said housing.

12. The linear motion guide apparatus as claimed in claim 11, wherein said tube includes at least one slot formed therein and communicating with said notch of said tube, said at least one slot of said tube is arranged for allowing an air to flow through said at least one slot of said tube and for preventing the lubricant from flowing through said at least one slot of said tube and from flowing between said bore of said tube and said chamber of said housing.

13. The linear motion guide apparatus as claimed in claim 11, wherein said lubricant-conveying member includes an extension extended into said bore of said tube for engaging with said lubricant-transmitting element.

14. The linear motion guide apparatus as claimed in claim 1, wherein said guide rail includes at least one longitudinal depression formed therein for engaging with said ball bearing device, and said lubricant-containing member includes at least one protrusion extended therefrom and engaged into said at least one longitudinal depression of said guide rail for supplying the lubricant to said at least one longitudinal depression of said guide rail.

15. A linear motion guide apparatus comprising:
a guide rail,
a slider slidably attached onto said guide rail for moving along said guide rail,
a ball bearing device disposed between said slider and said guide rail for facilitating a sliding movement between said slider and said guide rail and for allowing said slider and said guide rail to be smoothly moved relative to each other, and
a lubricating device including a housing slidably attached onto said guide rail and having a chamber formed therein for receiving a lubricant therein and for supplying the lubricant to lubricate said ball bearing device, and a lubricant-conveying member disposed in said chamber of said housing for absorbing the lubricant into said lubricant-conveying member, and
said housing including a tube having at least one slot formed therein and arranged for allowing an air to flow through said at least one slot of said tube and for preventing the lubricant from flowing through said at least one slot of said tube due to a surface tension.

16. The linear motion guide apparatus as claimed in claim 15, wherein said tube includes a notch formed therein and communicating with said chamber of said housing for receiving said upper segment of said lubricant-conveying member and for anchoring said lubricant-conveying member in said chamber of said housing, and said at least one slot of said tube is communicating with said notch of said tube and arranged for allowing the air to flow through said at least one slot of said tube and for preventing the lubricant from flowing through said at least one slot of said tube.

17. The linear motion guide apparatus as claimed in claim 16, wherein said lubricant-conveying member includes an upper segment disposed in said notch of said tube for partially blocking said at least one slot of said tube.

* * * * *